Figure 4:
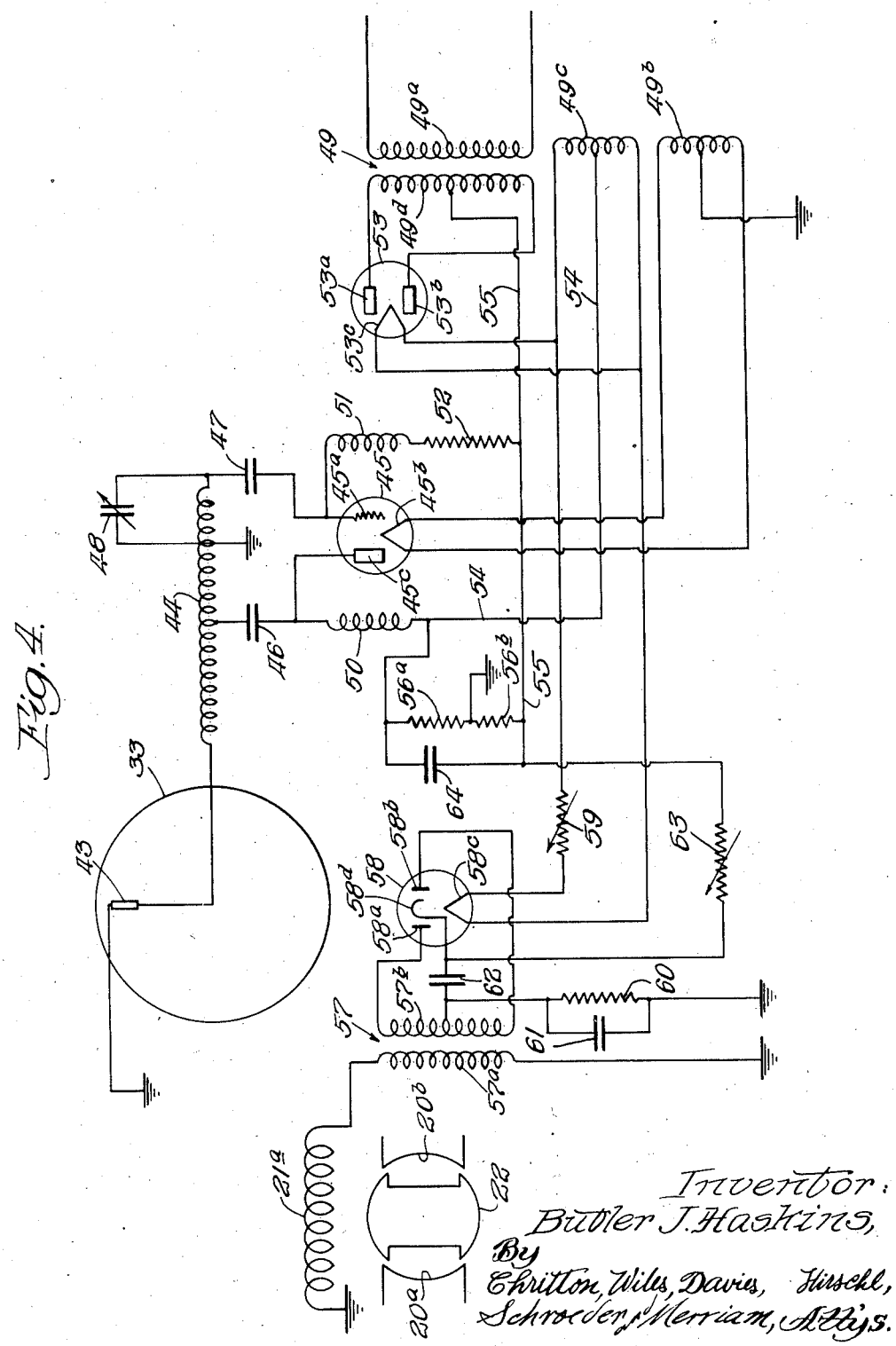

June 25, 1946.  B. J. HASKINS  2,402,749
MAGNETO TESTING
Filed Jan. 18, 1943  3 Sheets-Sheet 1
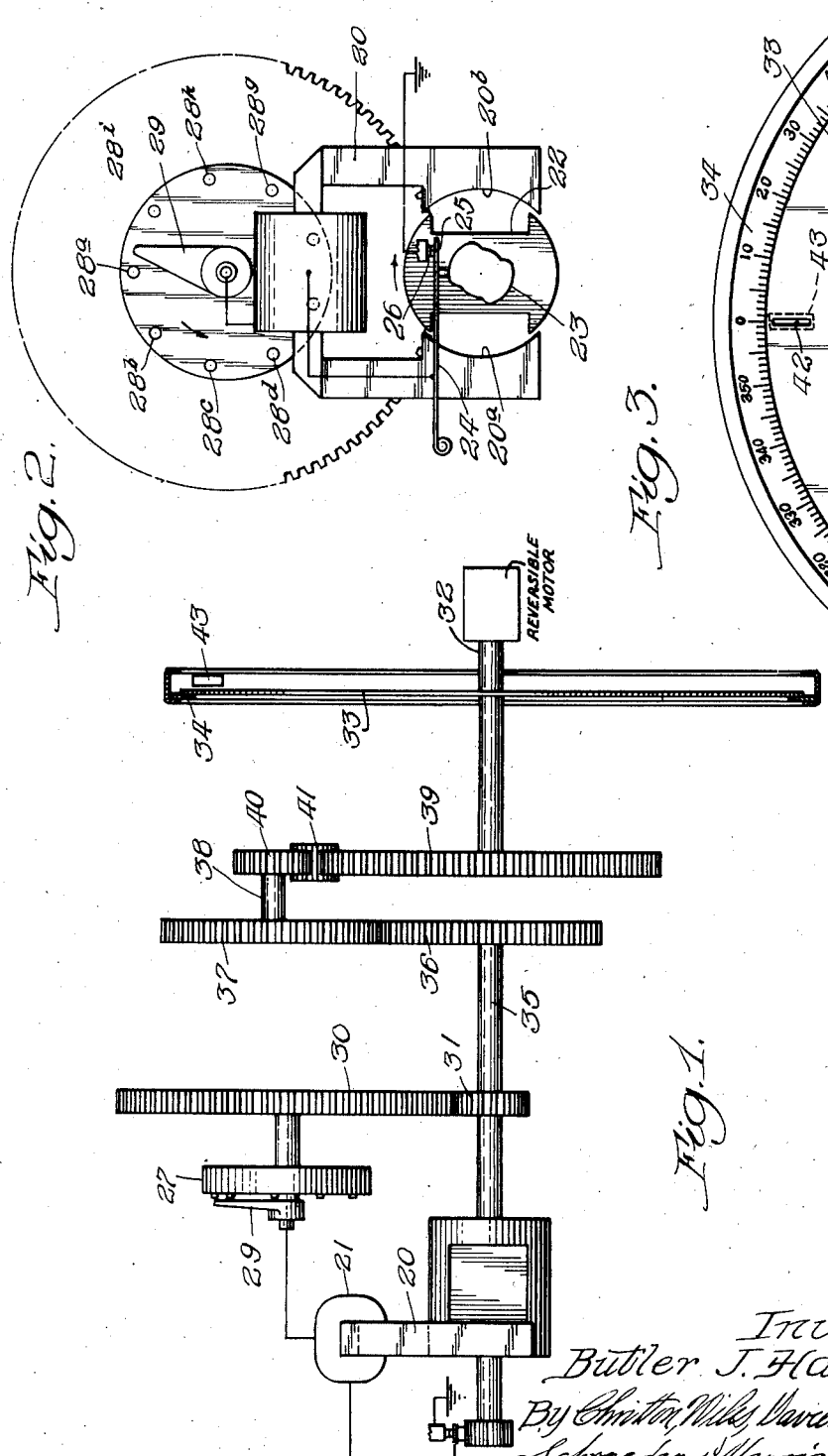
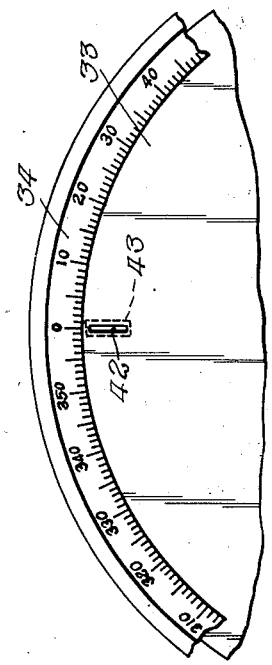
Inventor
Butler J. Haskins June 25, 1946.　　B. J. HASKINS　　2,402,749
MAGNETO TESTING
Filed Jan. 18, 1943　　3 Sheets-Sheet 2

Inventor:
Butler J. Haskins,
By
Chritton, Wiles, Davies, Hirschl,
Schroeder, Merriam, Attys.

June 25, 1946.  B. J. HASKINS  2,402,749
MAGNETO TESTING
Filed Jan. 18, 1943  3 Sheets-Sheet 3
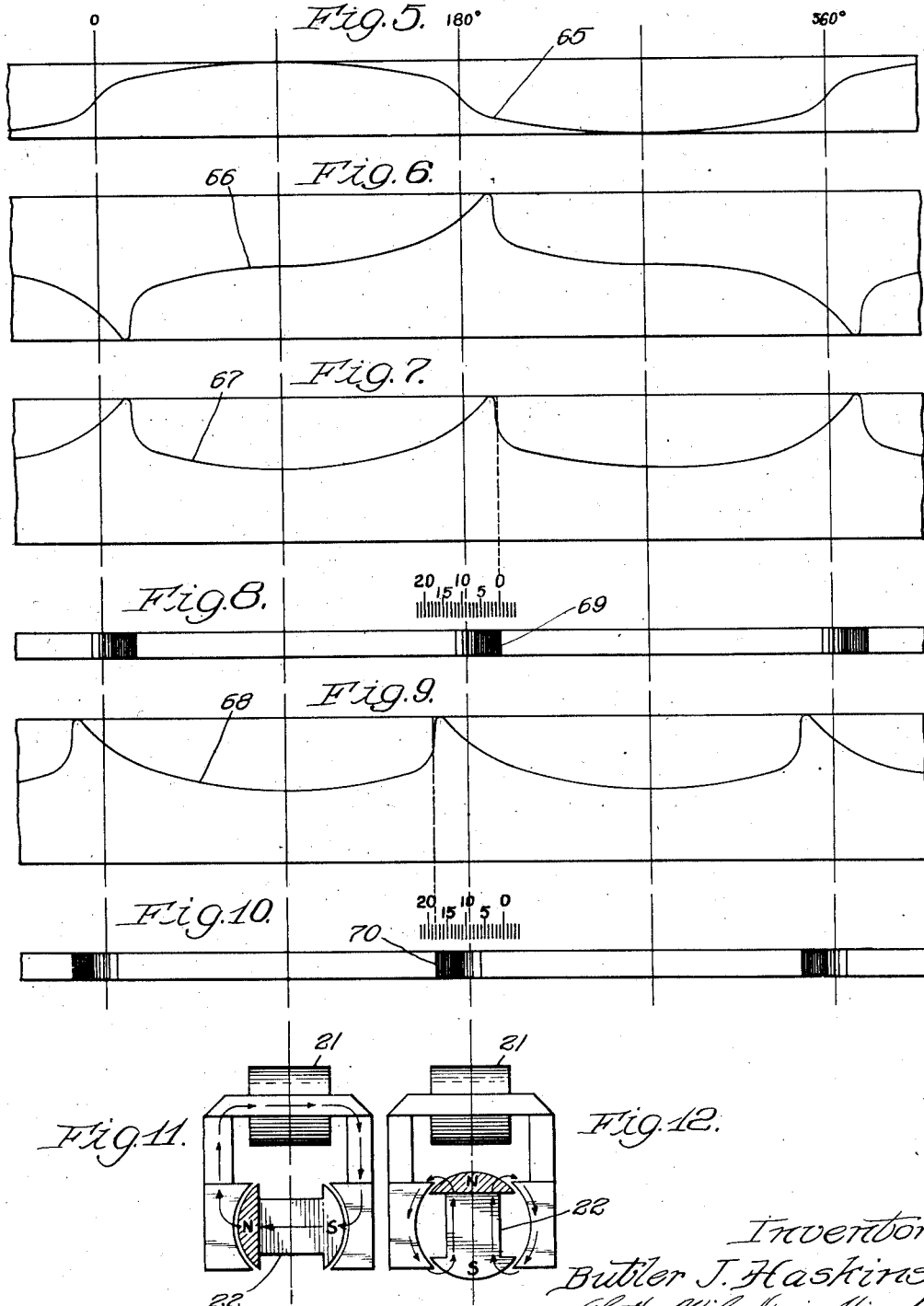

Patented June 25, 1946

2,402,749

UNITED STATES PATENT OFFICE 2,402,749

MAGNETO TESTING

Butler J. Haskins, Fox Lake, Ill., assignor to Joseph Weidenhoff, Inc., a corporation of Illinois Application January 18, 1943, Serial No. 472,727

1 Claim. (Cl. 175—183)

This invention relates to magneto testing, and more particularly to a method for electrically determining the neutral position of the rotor, without disassembling the magneto, as the initial step in the testing procedure.

One feature of this invention is that it provides an improvement in equipment for testing magnetos; another feature of this invention is that it enables very accurate electrical determination of the neutral position of the rotor and associated parts; yet another feature of this invention is that such determination may be made accurately and simply without disassembly of the magneto, and with the magneto in place for further test. Other features and advantages of this invention will be apparent from the following specification and drawings, in which:

Figure 1 is a schematic illustration of the pertinent mechanical portion of apparatus embodying my invention; Figure 2 is a front view of the magneto and distributor; Figure 3 is a fragmentary detail view of part of the indicating arrangement associated with the magneto; Figure 4 is a circuit diagram of the pertinent portion of the circuit of apparatus embodying my invention; Figure 5 is a view representative of the magnetic flux caused to flow through the core of the primary winding of the magneto by clockwise rotation of the rotor; Figure 6 is a view representative of the voltage generated in the magneto winding during such rotation; Figure 7 is a view representative of such voltage after it has been rectified; Figure 8 is a schematic illustration of the indicating apparatus during clockwise rotation of the rotor; Figure 9 is a view representative of the rectified voltage developed during counter-clockwise rotation; Figure 10 is a representation of the indicating device similar to that in Figure 8 but during counter-clockwise rotation of the rotor; Figure 11 is a schematic representation of the rotor and flux paths in a two-pole magneto when the flux through the winding is at its maximum; and Figure 12 is a similar representation of a magneto when the flux through the winding is at its minimum, with the rotor in neutral position.

Magnetos are becoming an increasingly important source of ignition current, particularly in connection with aircraft engines, and I have devised equipment for testing magnetos, determining the condition of the various magneto parts and whether they are properly performing their various functions, enabling accurate timing of the magneto, correct setting of the cams and breaker points, etc., other portions of such equipment being the subject of other copending applications.

The initial operation in the procedure of testing a magneto is the determination of the neutral position of the rotor, the position at which flux linkage through the primary winding has dropped to zero and is reversing, since all magneto manufacturers furnish information as to the setting of various parts of the magneto (as closure time and E-gap of the points, for example) with respect to this neutral position, defining the closure time as so many degrees before neutral, the E-gap as a certain number of degrees past neutral, and the like.

All previous procedures for determining the neutral position of the magneto rotor have either been very inaccurate or have required substantial disassembly of the magneto so that feeler gauges or similar mechanical indicating devices could be applied directly between the rotor and the pole pieces or other stationary parts of the magneto. Even when this was done the results were sometimes inaccurate, since manufacturing variations in the location of the pole pieces, their size, etc. sometimes results in the electrical neutral position not always coinciding with the same position of the rotor in different magnetos.

I have devised and am here disclosing and claiming means for determining the true electrical neutral position of the rotor of a magneto without removing the coil or disassembling the magneto. This is accomplished by isolating the breaker points from the primary circuit in which they are connected, connecting a rotatable indicating member to the magneto rotor for rotation in predetermined relation thereto, rotating the rotor and indicating means in a certain direction, and actuating indicating apparatus to determine when the voltage in a magneto winding has reached a certain value, then reversing the rotation of the parts and determining the position thereof when the voltage has reached the same value, neutral position being midway between the positions thus determined.

Referring now more particularly to Figures 1, 2 and 3, a magneto is shown having a frame 20 with pole faces 20a and 20b and carrying an induction coil 21 having primary and secondary windings. A rotor 22 revolves between the pole faces, the rotor shaft carrying a cam 23 actuating the movable arm 24 carrying the movable point of a pair of breaker points 25 and 26.

A distributor is shown comprising an insulating block 27 having terminals 28a—i equally spaced about the center of rotation of the distributor arm 29. The distributor arm and the rotor of the magneto rotate in a fixed relation determined by the drive gears 30 and 31, the ratio illustrated in this case being 4½ to 1, so that the rotor makes 4½ revolutions for each revolution of the distributor shaft.

In many conventional magnetos the distributor and the gears 30 and 31 are all a part of the magneto and encased within the same housing, but these parts are here illustrated as though they were separate for clarity of description. The magneto and distributor illustrated might be used, for example, to supply ignition current to a nine-cylinder radial engine. Normally a four-pole magneto would be used in connection with an engine having that many cylinders, but my invention is here being described in connection with a two-pole magneto in order that its operation may be more readily understood. The procedure for determining neutral position of the rotor of a magneto having four or more poles would be the same as that described hereafter for the magneto illustrated, and equally convenient and accurate.

The magneto and distributor combination are connected, through appropriate gearing, to a shaft 32 carrying a rotatable indicating member 33 adapted to cooperate with an annular scale 34. The shaft 32 provides drive means for rotating the disc member 33 and the magneto rotor in either direction, by being connected, for example, to a reversible electric motor.

While not essential to the determination of the true neutral position of the rotor, it is desirable for purposes of subsequent test procedures that the indicating disc 33 rotate at the same speed and in the same direction as the distributor arm 29. Accordingly changeable gear means are interposed between the shaft 32 and the shaft 35 carrying the gear 31, the gears being adapted to be changed to enable testing of different magnetos with different ratios between the rotor and the distributor speed. In the present case gears 36 and 37, carried by shaft 35 and an idler shaft 38, respectively, are of equal size; while gears 39 and 40, carried by shafts 32 and 38 respectively, have a 4½ to 1 ratio. It will be noted that these latter gears do not engage each other directly, but through an idler gear 41, so that the disc member 33 rotates in the same direction as the distributor arm, opposite to the direction of rotation of the rotor at any given instance.

As may be best seen in Figure 3, the disc member 33 is provided with a slot 42 having a neon or glow lamp 43 therebehind. This lamp is carried by and rotatable with the disc member 33, so that change in illumination of the lamp causes alternate light and dark bands to be visible during rotation of the disc. These bands are occasioned by persistence of vision, since during testing the disc would revolve at relatively high speeds in the neighborhood of one thousand or twelve hundred revolutions per minute. The rotatable disc member 33, the lamp 43, and the annular scale 34 provide indicating apparatus which not only enables determination of the neutral position of the magneto rotor in the manner disclosed in this application, but also subsequent testing for timing, point bounce, etc., not described here since they form no part of the invention to which this application is directed.

This indicating apparatus and the use of an oscillator for energizing the glow lamp and causing illumination thereof are the subject matter of my earlier Patent No. 1,966,066, which issued July 10, 1934, directed to distributor testing equipment for automotive distributors and ignition systems, and Patent No. 2,136,924 of one Ralph Reitherman, which issued November 15, 1938. Since the construction and operation of the indicating apparatus here used is fully disclosed in such prior patents, it will be described briefly here only to such extent as it is necessary to provide a disclosure of its construction and operation sufficient for the purposes of this application, and to provide a basis for the additional features disclosed here, the reader being referred to the specification of such prior patents to supplement the present disclosure as to any other details in which he might be interested.

The neon or glow lamp 43 carried by and rotatable with the indicating disc 33 is adapted to be energized by the high frequency alternating current generated by an oscillator which forms part of the magneto testing apparatus, some electrical condition of the magneto being used to control the energization, so that change in illumination of the lamp provides a very accurate indication of the electrical condition being used for such control. In my earlier Patent No. 1,966,066 mentioned above, opening and closing of the breaker points was used to control the ignition of the glow lamp, and that is one of the subsequent procedures in the complete testing of a magneto by the apparatus here disclosed.

In the initial test procedure, however, determination of electrical neutral, the breaker points are rendered inoperative (as by slipping a thin sheet of insulation between them, disconnecting them, or even removing them bodily from the magneto if desired), and the voltage generated in the primary winding of the magneto coil by rotation of the rotor is used for control of the oscillator and thus of the glow lamp illumination. When this voltage reaches a certain value the glow lamp lights, then as the voltage drops the lamp darkens, and these changes in illumination (the line of division between a light band and a dark band when the disc 33 is rotating), and more particularly the one when the lamp darkens, provide a very accurate position indication which is noted. Then the rotor and indicating disc are rotated in the opposite direction to determine (by the corresponding division line between the light and dark bands) when the voltage in the winding has reached the same value, neutral position of the rotor then being midway between the two positions as determined. Since the rotating disc 33 is associated with a graduated stationary scale, such determination can be easily made. Zero position of the scale would be adjusted to coincide with the division line between the bands when the rotor is turned in one direction (the graduated scale is manually movable about the same center as the disc member 33), then when the parts are rotated in the opposite direction the number of degrees difference in the position of the dividing line between the light and dark bands can be noted and the scale moved back half of this number of degrees. The zero graduation on the scale is then true zero for the rotor, and it can be brought to this position by rotating the disc until the light slot coincides with zero; and this scale position can be used as the reference position during subsequent testing and timing of the magneto.

Referring now more particularly to Figure 4, it will be seen that the glow lamp 43 has one terminal connecting to ground and the other terminal connected to one end of a coil 44 which acts both as an auto-transformer and as an inductance in the tank circuit of the oscillator. The oscillator is here shown as comprising a tube 45 having grid, cathode and plate elements 45a, 45b and 45c, respectively. The grid and plate element are connected through coupling condensers 46 and 47 to a portion of the coil 44, a smaller portion of this coil being bridged by the variable condenser 48. The cathode is grounded from the midpoint of one of the secondaries 49b of a power transformer 49 having a primary 49a, low voltage secondaries 49b and 49c, and a high voltage secondary 49d; and these parts, together with other conventional circuit elements such as the chokes 50 and 51 and the grid leak 52, provide an oscillator circuit of a substantially conventional type.

The outer ends of the secondary 49d are connected to the anodes 53a and 53b of a full wave rectifier tube 53, the cathode 53c of this tube being connected to the ends of the low voltage or filament secondary 49c and rectified plate voltage being developed between the wire 54 from the center tap of this secondary and the wire 55 from the center tap of the secondary 49d.

The wires 54 and 55 are connected to opposite ends of a bleeder resistor 56 comprising an upper portion 56a and a lower portion 56b, the upper portion preferably having several times the resistance of the lower portion and both having a high resistance. In a particular embodiment of my invention which I have constructed, for example, I have found five hundred thousand ohms for resistance 56a and two hundred thousand ohms for resistance 56b to be very satisfactory values. It will be noted that the center point or connection between these two resistors is grounded, the portion 56b being in the cathode-plate circuit of the oscillator 45 in such a way that the lower end of the resistor 56b (connected to the wire 55) has a negative potential considerably below ground. The grid element 45a of the oscillator tube 45 is connected through the choke 51 and grid leak 52 to the wire 55, and the voltage across the resistor 56b is normally sufficient to bias the oscillator tube below cutoff and prevent its oscillation.

In order to control the illumination of the glow lamp 43 as a function of the voltage developed in the primary winding 21a of the magneto during rotation of its rotor, I rectify the alternating voltage thus developed and use the rectified voltage to overcome the bias on the oscillator tube, so that when the voltage in the magneto primary has reached a certain level or value the oscillator will break into operation and the lamp 43 will be illuminated, and will remain illuminated until the rectified voltage decreases to the point where the fixed bias again prevents operation of the oscillator. Since the initiation of illumination is generally not as sharp a dividing line as that at cut-off, this latter is preferably used as the change in illumination providing the indication used in determining electrical neutral position of the magneto rotor.

Remembering that the breaker points have been rendered inoperative, I accomplished this desired control act by connecting the side of the primary winding which is normally connected to the breaker points to one side of a primary 57a of a transformer 57, the other side of this primary being grounded. The secondary 57b of this transformer is connected to the anodes 58a and 58b of a duo-diode tube 58, the filament 58c being energized through a five ohm filament rheostat 59 from the filament secondary 49c of the power transformer. The center tap of the secondary 57b is grounded through an appropriate resistor 60, which may have a value of fifteen hundred ohms, shunted by a conventional bypass condenser 61. The center tap of this secondary is also connected through a blocking condenser 62 to the cathode 58d, a connection being taken from this through a variable control resistance or rheostat 63, which may be of three thousand five hundred ohms, to the lower end of the biasing resistor 56b, a bypass for high frequency currents being provided by condenser 64 of fairly high value, as for example 4 mfd.

It will be apparent that alternating voltage developed in the primary winding 21a of the magneto is rectified into a direct current and delivered to the oscillator biasing resistor 56b in such a way as to oppose its voltage, control of the applied voltage being achieved through variation of the rheostat 63. It is thus only necessary to rotate the magneto rotor in one direction at a certain speed and adjust the rheostat 63 to a value where the lamp changes its illumination near top center (zero) position, note the point where the lamp darkens, and then, without changing any of the adjustments, to rotate the magneto rotor in the opposite direction and note the corresponding division line, as previously described.

The operation in this regard will be more fully understood by a consideration of Figures 5-12. Figure 11 shows the magneto rotor in a position such that the flux through the coil 21 is at its maximum, this being shown in alignment with the maximum flux point in Figures 5-10; and Figure 12 shows the rotor in such a position that there is no flux linkage through the coil 21, this being in alignment with the zero flux point in the other figures on this sheet. That is, the line 65 in Figure 5 represents the quantity of flux linking or passing through the coil 21 during rotation of the magneto rotor during one complete revolution from zero to three hundred sixty degrees, the flux through the coil rising sharply immediately after zero or neutral position of the rotor is passed and rising to a maximum at the ninety degree position illustrated in Figure 11, then reducing to zero at the one hundred eighty degree position illustrated in Figure 12, rising in value in the opposite or negative direction and finally returning to zero at the end of the cycle, three hundred sixty degrees. The alternating voltage developed across the winding during this flux variation is illustrated in Figure 6 by the line identified as 66, and it will be noted that both the negative and positive peaks of this voltage are similarly displaced from the zero positions of the magneto flux, being here shown as displaced about seven degrees, found to be a common displacement in a conventional magneto of this type. When this voltage is rectified by the means previously described the resultant rectified voltage may be considered as represented by the line 67 in Figure 7, the position of the peaks being unchanged, but all peaks now being positive. Figures 5, 6 and 7, are representative of the conditions during clockwise rotation of the rotor. Figure 9 is an illustration of the rectified voltage, indicated by the line identified as 68, developed during counter-clockwise rotation of the rotor.

Referring now more particularly to Figure 8, if the rheostat 63 is adjusted so that the lamp 43 is darkened just after the voltage peak is reached in clockwise rotation, this division between light and dark bands visible during rotation of the disc 33 will be indicated by the line 69, and the scale element 34 is rotated until zero registers with this line, as shown in the figure. Thereupon, without changing any of the adjustments, the rotor is rotated in the opposite direction at the same speed, the corresponding division line between the dark and light bands (indicated as 70) now lying on the other side of zero and registering with the eighteen degree graduation on the scale. It is then only necessary to move the graduated scale half of this distance (nine degrees in the present case) to the left, whereupon zero position will have been accurately determined and subsequent timing and testing operations may be readily carried on. An easy way to do this is to stop the rotation of the disc 33, move it by hand until the light slot coincides with the nine degree graduation on the scale when it is in the position shown in Figure 10, and then to move the graduated scale until zero coincides with the position of the light slot.

The apparatus and procedure heretofore described provides very quick and simple, yet accurate means for determining the true electrical neutral position of the rotor of a magneto, without disassembling it. This more accurate determination of rotor neutral or zero position enables more accurate timing of the magneto and improved operation of it and the ignition system in which it may be connected.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

A method for determining the neutral position of a magneto rotor in a magneto having a portion in which the magnetic flux varies in accordance with the position of the rotor and a winding disposed adjacent to said portion in inductive relationship to the flux therein, comprising: rotating said rotor in one direction; indicating, in terms of rotor position, when the voltage in the winding has reached a certain value; rotating the rotor in the other direction; and again indicating, in terms of rotor position, when the voltage in the same winding has reached the same value, whereby neutral position is midway between the two rotor positions thus determined.

BUTLER J. HASKINS.